United States Patent
Maruyama et al.

(10) Patent No.: US 10,504,550 B2
(45) Date of Patent: Dec. 10, 2019

(54) MAGNETIC DISK DEVICE CONFIGURED TO WRITE PARITY DATA THAT IS BASED ON DATA BEING WRITTEN TO A PARITY SECTOR WHEN NO ERROR IS DETECTED IN WRITING THE DATA BEING WRITTEN

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Syosuke Maruyama, Machida Tokyo (JP); Kana Furuhashi, Kawasaki Kanagawa (JP); Yosuke Kondo, Fujisawa Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/120,290

(22) Filed: Sep. 2, 2018

(65) Prior Publication Data

US 2019/0279678 A1 Sep. 12, 2019

(30) Foreign Application Priority Data

Mar. 6, 2018 (JP) .................................. 2018-040082

(51) Int. Cl.
*G11B 19/04* (2006.01)
*G11B 20/00* (2006.01)

(52) U.S. Cl.
CPC ...... *G11B 19/045* (2013.01); *G11B 20/00615* (2013.01); *G11B 20/00927* (2013.01); *G11B 19/04* (2013.01); *G11B 19/041* (2013.01); *G11B 20/0063* (2013.01); *G11B 20/0092* (2013.01)

(58) Field of Classification Search
None
See application file for complete search history.

(56) References Cited

U.S. PATENT DOCUMENTS

| | | | |
|---|---|---|---|
| 8,301,912 B2 | 10/2012 | Lin et al. | |
| 8,699,162 B1* | 4/2014 | Grobis | G11B 5/09 360/45 |
| 8,856,618 B2* | 10/2014 | Akiyama | G11B 20/1833 714/752 |

(Continued)

FOREIGN PATENT DOCUMENTS

| | | |
|---|---|---|
| JP | 2010-019771 A | 1/2010 |
| JP | 2010-049771 A | 3/2010 |

*Primary Examiner* — Tan X Dinh
(74) *Attorney, Agent, or Firm* — Kim & Stewart LLP

(57) ABSTRACT

A magnetic disk device includes a plurality of tracks and a controller. The controller receives write data to be written to a first sector of a track, generates a first data string based on the write data and a logical identifier for the first sector, attempts to cause the first data string to be written to the first sector, determines whether a write error has occurred while the first data string is written to the first sector, generates a second data string based at least in part on the first data string, and in response to determining that no write error has occurred while the first data string is written to the first sector, writes a parity data string that is based at least in part on the second data string to a second sector of the track that stores parity data for the track.

20 Claims, 5 Drawing Sheets

(56) References Cited

U.S. PATENT DOCUMENTS

| | | | |
|---|---|---|---|
| 9,530,442 B1* | 12/2016 | Hassner | G06F 11/0727 |
| 9,905,263 B2* | 2/2018 | Kojima | G11B 20/1833 |
| 2003/0169878 A1 | 9/2003 | Miles | |
| 2013/0148225 A1* | 6/2013 | Coker | G11B 19/045 |
| | | | 360/31 |
| 2014/0139942 A1* | 5/2014 | Grobis | G11B 20/182 |
| | | | 360/51 |
| 2015/0128008 A1* | 5/2015 | Chatradhi | G11B 20/1833 |
| | | | 714/766 |
| 2015/0178161 A1* | 6/2015 | Burd | G11B 20/1833 |
| | | | 714/764 |
| 2015/0254135 A1* | 9/2015 | Chatradhi | G06F 11/1076 |
| | | | 714/764 |
| 2016/0148625 A1* | 5/2016 | Zhu | G11B 5/09 |
| | | | 360/48 |

* cited by examiner

MASK UPDATING OF PARITY BUFFER

MAGNETIC DISK DEVICE CONFIGURED TO WRITE PARITY DATA THAT IS BASED ON DATA BEING WRITTEN TO A PARITY SECTOR WHEN NO ERROR IS DETECTED IN WRITING THE DATA BEING WRITTEN

CROSS-REFERENCE TO RELATED APPLICATIONS

This application is based upon and claims the benefit of priority from Japanese Patent Application No. 2018-040082, filed Mar. 6, 2018, the entire contents of which are incorporated herein by reference.

FIELD

Embodiments described herein relate generally to a magnetic disk device and a recording method.

BACKGROUND

In a shingled magnetic recording (SMR) magnetic disk device (hereinafter, an SMR device), a sector position of a sector that is a write-retrying target is different from the sector position of the sector in which the write-retrying is actually performed. That is, a sector in which a writing error occurs is handled as a defective sector during the writing-retrying and the data to be written to that defective sector are instead written to the sector following the defective sector. In this way, the write re-trying process is not performed on the defective sector, and therefore cannot adversely affect adjacent tracks due to data being written multiple times in the same location.

On the other hand, in SMR devices, an error correction process for an entire track is generally employed as an error correction method. To enable the error correction process for an entire track, an exclusive OR (XOR) operation is performed on write data to generate parity information for the track, starting from a head or first sector of the track. The parity information for the track is then recorded in a predetermined sector of the track. Thus, the error correction process for a track depends on generating a so-called parity sector for that track.

In practice, in the error correction process for a specific track, the write data is mixed with a different seed value for each of the sectors, so that the parity information is not biased to I/O. In this case, a physical sector number is generally set as such a seed value for mixing. However, in an SMR device, a position of the sector on a medium is changed by the write-retrying process, so that the seed value for mixing is different for the sector in which the write-retrying is actually performed than the seed value for mixing for the original sector (where the original sector is the target sector of the write-retrying process). Thus, for the same data, the parity information has a different value. For this reason, when a writing error occurs, the parity sector for a particular track needs to be calculated starting at the head or first sector of the track.

DETAILED DESCRIPTION

Figure 1:
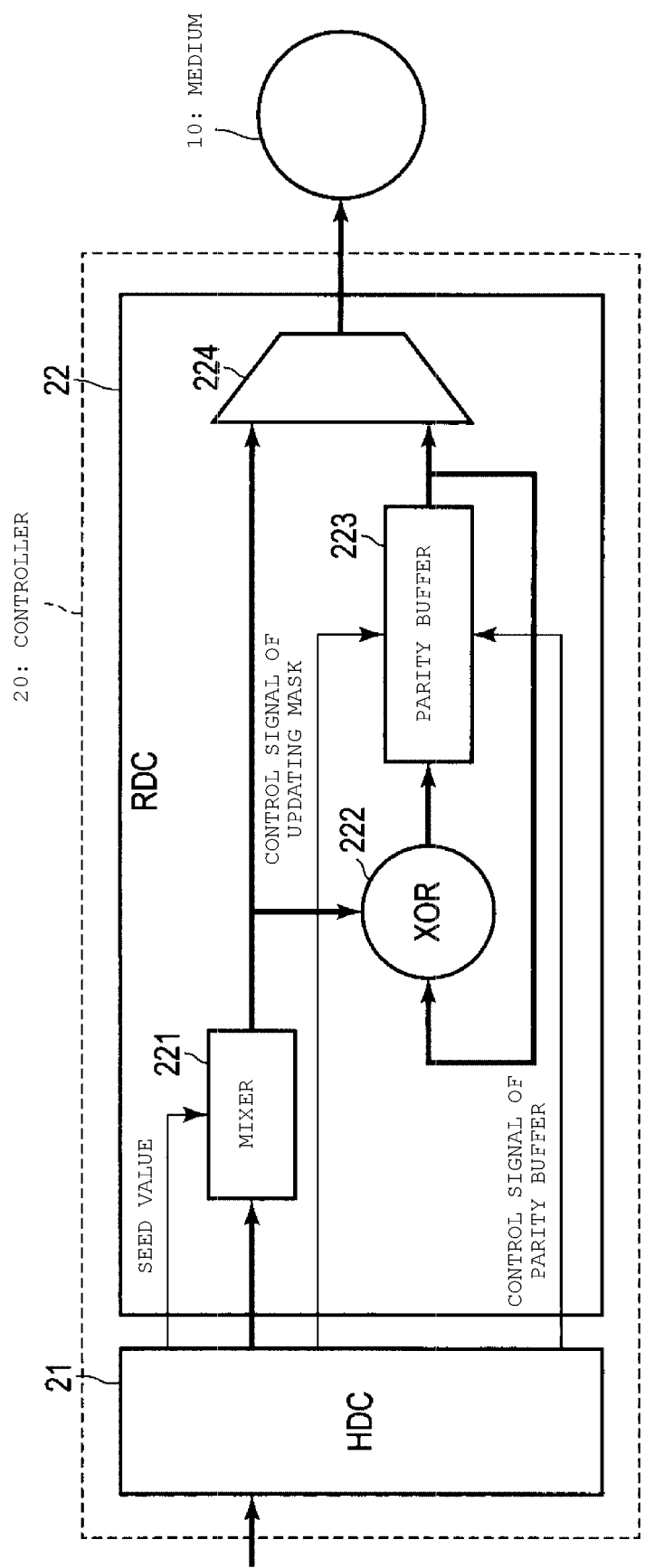
FIG. 1 is a block diagram schematically illustrating a magnetic disk device according to an embodiment.

Embodiments provide a magnetic disk device and a recording method which do not need to restart calculation of a parity sector for an error correction process in a track unit even when a writing error occurs.

In general, according to one embodiment, a magnetic disk device includes a plurality of tracks on which data are written to and read from and a controller. The controller is configured to receive write data to be written to a first sector of a track in the plurality of tracks, generate a first data string based on the write data and on a logical identifier for the first sector, attempt to cause the first data string to be written to the first sector, determine whether a write error has occurred while the first data string is written to the first sector, generate a second data string based at least in part on the first data string, and in response to determining that no write error has occurred while the first data string is written to the first sector, write a parity data string that is based at least in part on the second data string to a second sector of the track that stores parity data for the track.

Hereinafter, the embodiment will be described with reference to drawings.

This disclosure is merely an example. The gist of the embodiments can be appropriately modified and easily implemented by those skilled in the art within the scope of the embodiments. In addition, in order to clearly describe the embodiments, the drawings may be schematically represented in terms of widths, thicknesses, shapes, and the like that are not necessary to scale as compared with an actual implementation. Further, the drawings are only examples and do not limit the scope of the embodiments. Further, in the embodiments and each of the drawings described herein, the same reference numerals are given to elements described previously with reference to preceding drawings, and the detailed description thereof may be omitted as appropriate.

Embodiment

FIG. 1 is a block diagram schematically illustrating an SMR type magnetic disk device (HDD) according to the embodiment. The HDD illustrated in FIG. 1 includes a medium 10 which is a magnetic disk of a recording medium and a controller 20 which controls writing/reading of data to/from the medium 10. The controller 20 includes a hard disk controller (HDC) 21 and a read channel (RDC) 22.

Although not illustrated in detail, the HDC 21 includes a buffer memory, a buffer control circuit, a cache control circuit, an interface control circuit, a servo circuit, and the like. The HDC 21 inputs write data, to be written to the disk, received from a host controller to the buffer memory, and generates a control signal of the parity buffer (reset of parity buffer, selector of parity buffer, or the like), a writing gate, and a seed value based on a logical sector number for a specific sector.

The RDC 22 includes a mixer 221, an XOR circuit 222, a parity buffer 223, and a gate circuit 224. In addition, although not illustrated in detail, the RDC 22 further includes an encoding circuit and a decoding circuit for error correction. The mixer 221 accepts the write data transmitted from the HDC 21 on a sector-by-sector basis and mixes the write data for a particular sector with the seed value given from the HDC 21 for that particular sector. An output of the mixing is transmitted to the medium 10 via the gate circuit 224, and is subsequently written to a sector of a predetermined track. The XOR circuit 222 calculates an exclusive logical sum (XOR) of the output of the mixing and an output of the parity buffer 223. A result of the XOR calculation is stored in the parity buffer 223. The parity buffer 223 subsequently and temporarily stores the output of the XOR circuit 222 and outputs the parity information stored therein when write data to the track is completed. The parity information is transmitted to the medium 10 via the gate circuit 224 and is written to a parity sector for that track. In addition, the parity buffer 223 receives a control signal for an updating mask transmitted from the HDC 21. The parity buffer 223 stops updating parity for a time period designated by the control signal of the updating mask. For example, in some embodiments, the control signal of the updating mask is implemented as a flag or bit that can be toggled between the values "1" and "0". When such a flag has a value of "0", the parity buffer 223 is updated normally, but when the flag has a value of "1", the parity buffer 223 is not updated.

In reference to the configuration described above and to FIGS. 2 to 5E, an error correction process for a track controlled by the HDC 21 will now be described.

Figure 2:
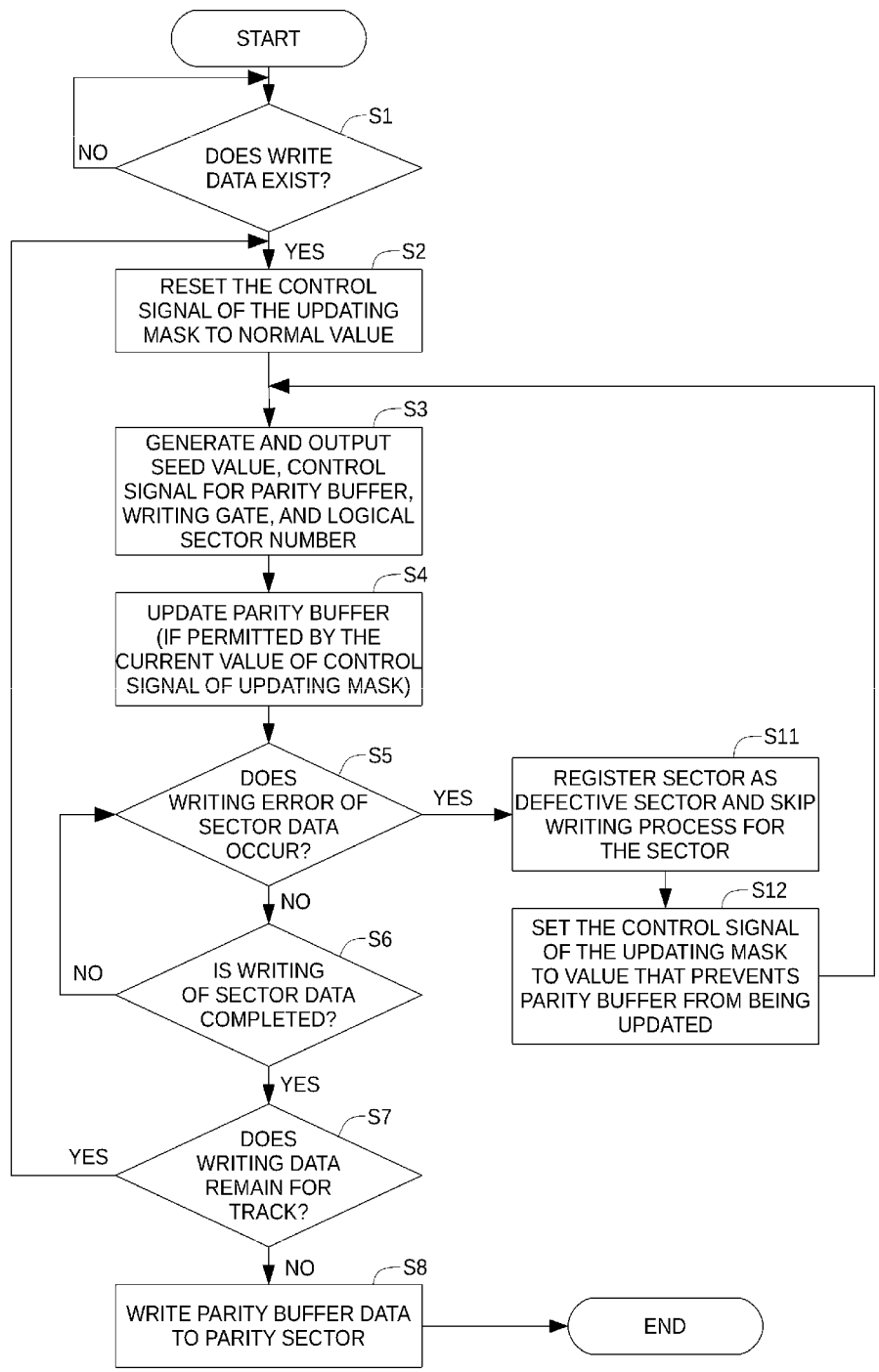
FIG. 2 is a flowchart illustrating a flow of a process of generating a parity sector in the embodiment.

FIG. 2 illustrates a control operation of the HDC 21, FIGS. 3A to 3F illustrate writing control states when a writing error occurs, FIGS. 4A to 4E illustrate writing control states when a writing error occurs when a physical sector number is set as a seed value for scrambling, and FIGS. 5A to 5E illustrate writing control states when a writing error occurs when a logical sector number is set as the seed value for mixing.

As illustrated in FIG. 2, when it is determined that write data exists (step S1), and the HDC 21 resets the control signal of the updating mask to the normal value (step S2). For example, in embodiments in which the control signal of the updating mask is implemented as a flag or bit that can be toggled between the values "1" and "0", in step S2 the flag is reset to a value (e.g., "0") indicating that the parity buffer 223 is updated normally. The HDC 21 generates the control signal for the parity buffer (reset of parity buffer, selector of parity buffer, or the like), the writing gate, and the seed value based on the logical sector number for a particular sector and outputs the control signal, the writing gate, and the seed value to the RDC 22 (step S3). Parity sector data is then generated and, if permitted by the current value of the control signal of the updating mask, the parity buffer 223 is updated (step S4). For example, in embodiments in which the control signal of the updating mask is implemented as a flag or bit that can be toggled between the values "1" and "0", in step S4 the current parity data in parity buffer 223 is not updated when the flag is set to a value (e.g., "1") indicating that the current parity data in parity buffer 223 is not be updated, and the current parity data in parity buffer 223 is updated when the flag is set to a value (e.g., "0") indicating that the current parity data in parity buffer 223 is to be updated. It is noted that the parity sector data is generated based on the seed value received in step S3, and step S3 occurs before the monitoring for writing errors occurs in step S5. Alternatively, in some embodiments, step S4 is performed in parallel with or simultaneously with step S5. The writing process is then monitored for writing errors as data is written to the sector (step S5). When a writing error does not occur, it is determined whether or not any write data for the sector remains, and therefore whether writing of the sector data is completed (step S6). When the writing of the sector data is completed (YES) and no write data for the sector remains to be written, the HDC 21 determines whether or not additional write data remains to be written to the current track (step S7). When there is additional write data remaining to be written to the track (YES), the process returns to step S2 and the HDC 21 processes the next sector of the track for which data are to be written. When the writing of data to the track is completed N(O), writing of the parity buffer data is subsequently performed, i.e., the data in the parity buffer 223 are written to the parity sector of the track (step S8), then the processes ends.

When a writing error is detected in step S5, the sector in which the writing error occurs is registered as a defective sector and the writing of the sector data to the sector is skipped (step S11). The control signal of the updating mask is output to the parity buffer 223 to maintain the current parity data stored in the parity buffer 223 until after the sector data are written to a data sector without a writing error occurring (step S12). For example, in embodiments in which the control signal of the updating mask is implemented as a flag orbit that can be toggled between the values "1" and "0", in step S12 the flag is reset to a value (e.g., "1") indicating that the current parity data in parity buffer 223 is not be updated. The control operation then returns to step s4 so that writing the sector data to another sector can be attempted. If a writing error is again detected, in step S5, the control operation again proceeds to step S11. The sector in which the writing error is detected is registered as a defective sector, and the writing process for the defective sector is skipped (step S11). The control signal of the updating mask is set (or retained at) the value (e.g., "1") indicating that the current parity data in the parity buffer 223 is not be updated. The control signal of the updating mask is then output to the RDC 22 (step S12). Thus, the control signal of the updating mask prevents the parity data stored in the parity buffer 223 from being changed when write errors occur in a sector. It is noted that the parity data stored in the parity buffer 223 is generated with a seed value that is based on a logical sector number. Because the logical sector number does not change when a write error occurs, the parity data stored in the parity buffer 223 is still correct after a write error is detected, as long as the parity data stored in the parity buffer 223 is not updated until sector data is written successfully in a sector, and a new sector is being processed.

The control process of the HDC 21 will be described in detail with reference to FIGS. 3A to 5E. In FIGS. 3A to 5E, "" indicates data after a mixing process has been performed on the write data. "" indicates that the data on which the mixing process is performed is different from the data indicated with "".

Figure 3A:
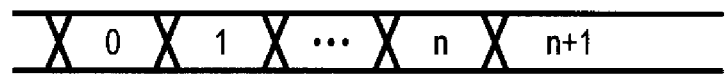
FIGS. 3A to 3F are time charts illustrating a state of writing control when a writing error occurs in the embodiment.
Figure 3B:
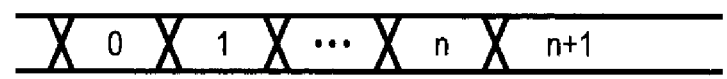
Figure 3C:
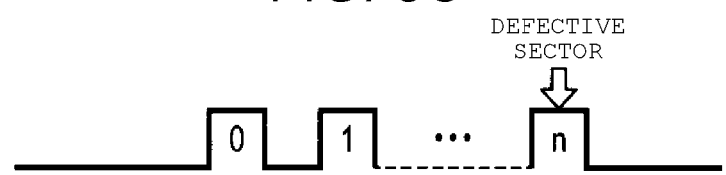
Figure 3D:
Figure 3E:
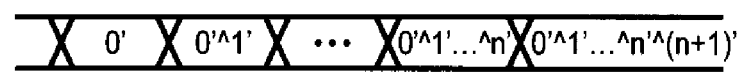
Figure 3F:

FIGS. 3A, 3B, 3C and 3D respectively illustrate, with respect to time (which advances from left to right), the state of the write data output by the HDC 21, the seed data output by the HDC 21, the write gate output by the HDC 21, and the parity reset signal output by the HDC 21. FIG. 3E illustrates the parity data that is updated in the parity buffer 223. FIG. 3F illustrates when a writing error occurs when a sector n is written, and the sector n is then handled as a defective sector.

Figure 4A:
FIGS. 4A to 4E are time charts illustrating a state of writing control when the writing error occurs in a case where a physical sector number is set as a seed value for scrambling in the embodiment.
Figure 4B:
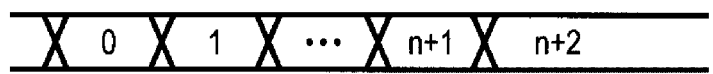
Figure 4C:
Figure 4D:
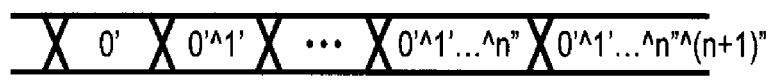
Figure 4E:

FIGS. 4A to 4E respectively illustrate, with respect to time (which advances from left to right), a state of the write data, the seed data, the write gate, the parity data buffered in the parity buffer 223, and the parity reset signal during a recovery process performed in response to a write error, where the seed value for mixing is the physical sector number. As illustrated in FIGS. 4A to 4E, if the sector n is registered as the defective sector (because the write error has occurred in sector n when writing to the sector n, as shown in FIGS. 3A to 3F), the HDC 21 transmits the parity reset to the parity buffer 223 (see FIG. 4E). The HDC 21 then skips the sector n by registering the sector n as a defective sector and continuing on to the sector n+1. In this case, the seed value associated with the sector n before registration of the defective sector (which, as shown in FIG. 3E, equals $0'^{\wedge}1' \ldots ^{\wedge}n'$) is different from the seed value after the registration of the sector n as a defective sector (which, as shown in FIG. 4D, equals $0'^{\wedge}1' \ldots ^{\wedge}n'$). Therefore, the calculation of the parity data for storage in the parity sector is restarted from a head or initial sector of the track (e.g., sector 0). That is, although sector data is written to the remaining sectors of the track, the parity data to be written to the parity sector for the track is not correct. Therefore, in a subsequent rotation of the recording medium 10, the HDC 21 must recalculate the parity data for the track.

Therefore, according to embodiments described herein, each seed value for mixing is based on a logical sector number or other logical identifier for each sector rather than on the physical sector number of each sector. For numbering of or otherwise identifying the logical sector number, the sectors that are not registered as a defective sector on the track are numbered sequentially from a position of a physical sector number 0. However, it is assumed that the logical sector number is also used for calculating the physical sector number of a position (i.e., sector) to be written to on the medium 10.

Figure 5A:
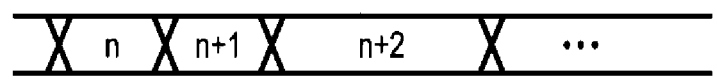
FIGS. 5A to 5E are time charts illustrating a state of writing control when the writing error occurs in a case where a logical sector number is set as the seed value for scrambling in the embodiment.
Figure 5B:
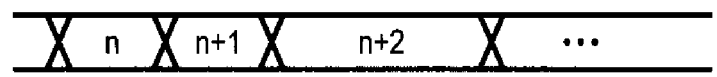
Figure 5C:
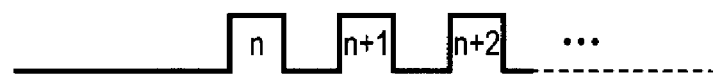
Figure 5D:
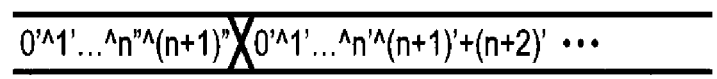
Figure 5E:
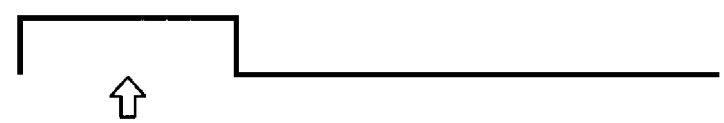

FIGS. 5A to 5D respectively illustrate, with respect to time (which advances from left to right), a state of the write data, the seed data, the writing gate, and the parity data that is calculated for subsequent storage in the parity buffer 223, and FIG. 5E illustrates a value for a parity mask control signal during the recovery process that is performed in response to the write error. As illustrated in FIGS. 5A to 5E, when the seed value for mixing is based on or otherwise includes the logical sector number, the writing to the track continues from the sector following the sector in which the write error occurs. After the calculation of the data to be stored in the parity sector, the parity data in parity buffer is not reset (as shown in FIG. 4D, in which the parity calculation is restarted from a head or initial sector of the track). Instead, updating of the parity data when writing sector data to the sector following the sector in which the write error occurs is masked (because the value of the control signal of the updating mask is set to a value ("1" in FIG. 5E) indicating that the current parity data in parity buffer 223 is not be updated). That is, the current parity data in parity buffer 223 is not updated until the value of the control signal of the updating mask is set to a value ("0" in FIG. 5E) indicating that the current parity data in parity buffer 223 is to be updated. Specifically, the value of the control signal of the updating mask is reset to the normal value (e.g., "0") after the sector data associated with the write error is written successfully to a sector (see step S2). Therefore, the updating of the parity data in the parity buffer 223 is then restarted.

As described above, in the HDD according to the embodiment, when a write error occurs during calculation of data for the parity sector, a physical region in which the write error occurs is treated as a defective sector. Since the logical sector number is set as an element of the seed value for a mixing function, the logical sector number of the sector in which the write error occurs is a number indicating the physical region next to the physical region in which the write error occurs. Since the logical sector number for the sector determined to be defective and for the sector in which the data originally to be written to the defective sector is actually written is the same, by using the logical sector number for the seed value for mixing, it is possible to use a data string for the sector in which the write error occurs that is the same value as the data string generated and stored in the parity buffer 223 when the write error occurs. At this time, since a correct value of the parity sector can be calculated during the calculation, the parity buffer 223 is masked by the number of the sectors not requiring parity updating. Accordingly, the write process can be restarted from the sector in which the write error occurs, and the data calculated for the updating the parity sector can be efficiently calculated.

Although the SMR type magnetic disk device is described as an example in the embodiment described above, the embodiment is not limited to SMR devices. In addition, although an instance is described in which the logical sector number is used as the seed value for mixing, logical block addressing (LBA) or any other logical identifier of physical sectors may be used instead of the logical sector number.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic disk that includes a plurality of tracks on which data are written to and read from; and
    a controller configured to
        receive write data to be written to a first sector of a track in the plurality of tracks,
        generate a first data string based on the write data and on a logical identifier for the first sector,
        attempt to cause the first data string to be written to the first sector,
        determine whether a write error has occurred while the first data string is written to the first sector,
        generate a second data string based at least in part on the first data string, and
        in response to determining that no write error has occurred while the first data string is written to the first sector, cause a parity data string that is based at least in part on the second data string to be written to a second sector of the track that stores parity data for the track.

2. The magnetic disk device according to claim 1, wherein the second sector of the track that stores parity data for the track is disposed at an end of the track.

3. The magnetic disk device according to claim 1, wherein the controller generates the first data string by performing a mixing function on the write data and the logical identifier for the first sector.

4. The magnetic disk device according to claim 1, wherein the controller is further configured to:
  receive write data to be written to a third sector of the track that is adjacent to the first sector of the track,
  generate a third data string based on the write data to be written to the third sector of the track and a logical identifier for the third sector,
  attempt to cause the third data string to be written to the third sector, and
  determine whether a write error has occurred while the third data string is written to the third sector.

5. The magnetic disk device according to claim 4, wherein the controller is further configured to:
  generate a fourth data string based at least in part on the first data string and the third data string, and
  in response to the controller determining that no write error has occurred while the third data string is written to the third sector, cause the parity data string to be written to the second sector of the track that stores parity data for the track, and
  the parity data string that is based at least in part on the second data string is also based at least in part on the fourth data string.

6. The magnetic disk device according to claim 4, wherein the controller is further configured to:
  generate the third data string based on the write data to be written to the third sector prior to attempting to cause the third data string to be written to the third sector.

7. The magnetic disk device according to claim 4, wherein the controller is further configured to: generate the fourth data string based at least in part on the first data string and the third data string by performing an XOR operation on the first data string and the third data string.

8. The magnetic disk device according to claim 4, wherein the controller is further configured to: generate a fourth data string based at least in part on the first data string and the third data string,
  store the fourth data string in a parity data buffer, and
  in response to the controller determining that a write error has occurred while the third data string is written to the third sector, output a control signal that prevents the fourth data string from being overwritten until the third data string is written to a non-defective sector of the track.

9. The magnetic disk device according to claim 8, wherein the controller is further configured to:
  in response to the controller determining that the write error has occurred while the third data string is written to the third sector, designate the third sector as a defective sector.

10. The magnetic disk device according to claim 8, wherein the controller is further configured to:
  in response to the controller determining that the write error has occurred while the third data string is written to the third sector, attempt to cause the third data string to be written to a fifth sector of the track, and
  determine whether a write error has occurred while the third data string is written to the fifth sector.

11. The magnetic disk device according to claim 10, wherein the fifth sector of the track is adjacent to the third sector of the track.

12. The magnetic disk device according to claim 10, wherein the controller is further configured to:
  in response to the controller determining that no write error has occurred while the third data string is written to the fifth sector, cause the parity data string to be written to the second sector of the track that stores parity data for the track,
  wherein the parity data string that is based at least in part on the second data string is also based at least in part on the fourth data string.

13. The magnetic disk device according to claim 10, wherein the controller is further configured to:
  in response to the controller determining that no write error has occurred while the third data string is written to the fifth sector, output a control signal that allows the fourth data string to be overwritten.

14. The magnetic disk device according to claim 13, wherein the control signal that allows the fourth data string to be overwritten is transmitted to a read channel of the magnetic disk device.

15. A method of writing data in a magnetic disk device which performs writing/reading of data on a magnetic disk, the method comprising:
  receiving write data to be written to a first sector of a track in the plurality of tracks;
  generating a first data string based on the write data and on a logical identifier for the first sector;
  attempting to cause the first data string to be written to the first sector;
  determining whether a write error has occurred while the first data string is written to the first sector;
  generating a second data string based at least in part on the first data string; and
  in response to determining that no write error has occurred while the first data string is written to the first sector, writing a parity data string that is based at least in part on the second data string to a second sector of the track that stores parity data for the track.

16. The method according to claim 15, wherein
  generating the first data string comprises performing a mixing function on the write data and the logical identifier for the first sector.

17. The method according to claim 15, further comprising:
  receiving write data to be written to a third sector of the track that is adjacent to the first sector of the track;
  generating a third data string based on the write data to be written to the third sector of the track and a logical identifier for the third sector;
  attempting to cause the third data string to be written to the third sector; and
  determining whether a write error has occurred while the third data string is written to the third sector.

18. The method according to claim 17, further comprising:
  generating a fourth data string based at least in part on the first data string and the third data string; and
  in response to the determining that no write error has occurred while the third data string is written to the third sector, writing the parity data string to the second sector of the track that stores parity data for the track,
  wherein the parity data string that is based at least in part on the second data string is also based at least in part on the fourth data string.

19. The method according to claim 17, further comprising:
  generating the third data string based on the write data to be written to the third sector prior to attempting to cause the third data string to be written to the third sector.

20. The method according to claim 17, further comprising:
    generating the fourth data string based at least in part on the first data string and the third data string by performing an XOR operation on the first data string and the third data string.

* * * * *